United States Patent [19]

Briltz

[11] 4,164,470

[45] Aug. 14, 1979

[54] AUGER TYPE SCREENING DEVICE FOR REMOVING SEDIMENT AND THE LIKE FROM SOLUTIONS

[75] Inventor: Raymond P. Briltz, Grenfell, Canada

[73] Assignee: Global Pollution Control Co. (1975) Ltd., Canada

[21] Appl. No.: 867,840

[22] Filed: Jan. 9, 1978

[51] Int. Cl.² .............................................. B01D 17/00
[52] U.S. Cl. ................................... 210/523; 198/677
[58] Field of Search .............................. 100/145–150; 366/320, 319, 302, 64, 307; 198/676, 677; 23/273 F, 270 R, 267 MS; 210/350, 359, 523

[56] References Cited

U.S. PATENT DOCUMENTS

| | | | |
|---|---|---|---|
| 2,012,298 | 8/1935 | Berge | 23/270 R |
| 2,559,257 | 7/1951 | Obey | 23/270 R |
| 3,117,031 | 1/1964 | Griffiths | 23/270 R |

*Primary Examiner*—Frank Sever
*Attorney, Agent, or Firm*—Ade, Kent & Associates

[57] ABSTRACT

Means are utilized to cause deposition of solids from a solution such as sewage. Tube clarifiers are then utilized to settle the solids by gravity whereupon the solids are urged to a sediment discharge by means of an auger thus leaving clarified liquid for separate discharge. The tube clarifier may include stationary or adjustable screens or baffles to trap the solids to assist in the settlement and/or the auger flight may be perforated for a similar reason.

4 Claims, 16 Drawing Figures

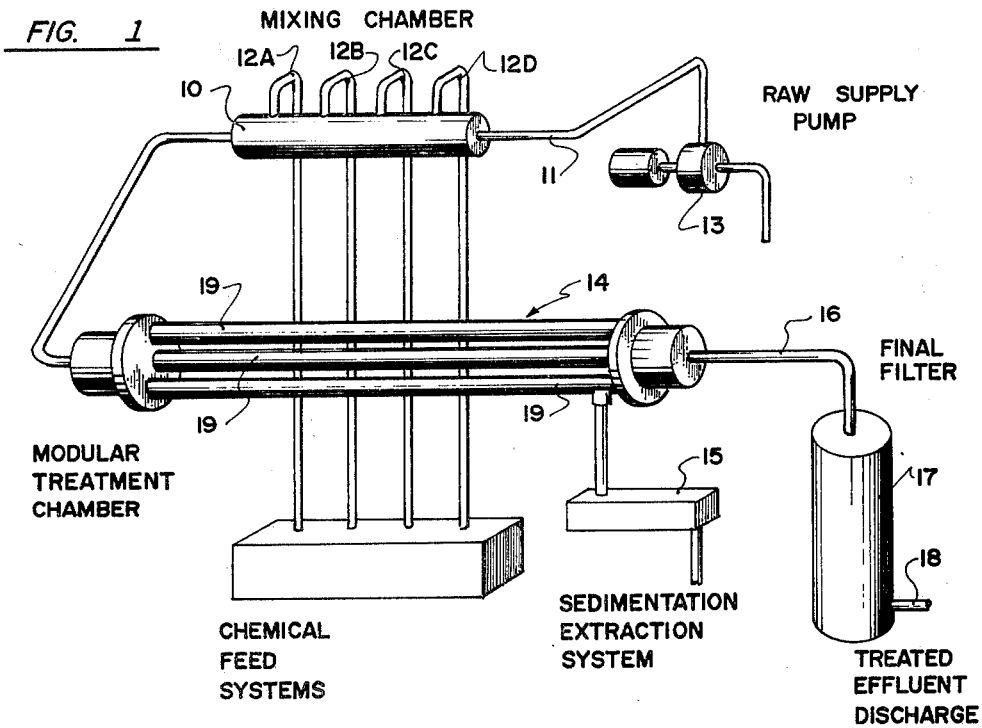
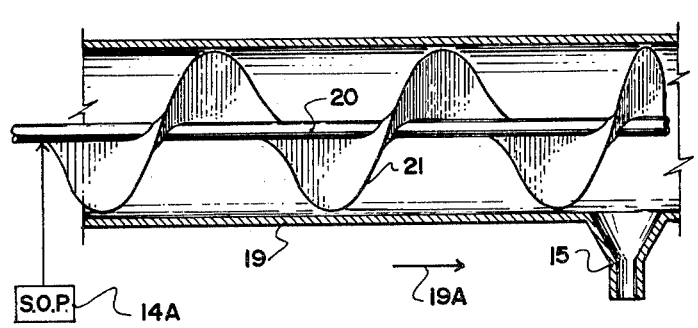
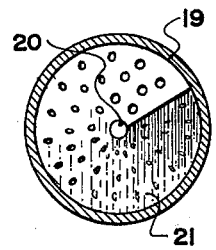
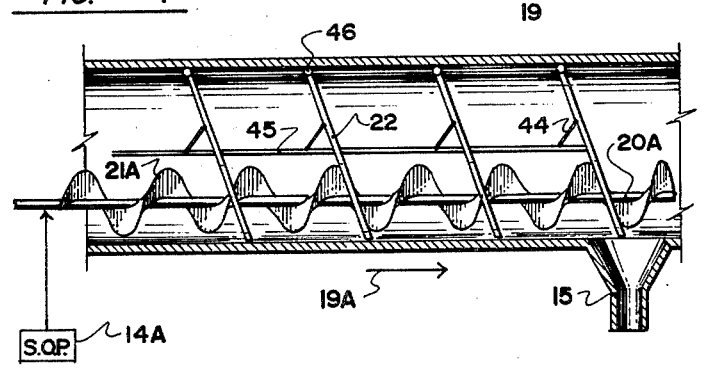
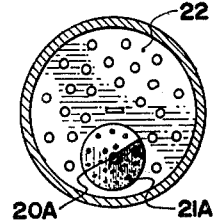

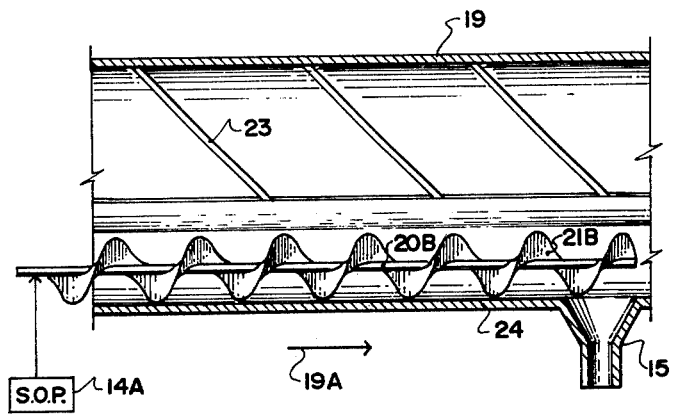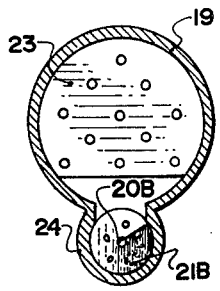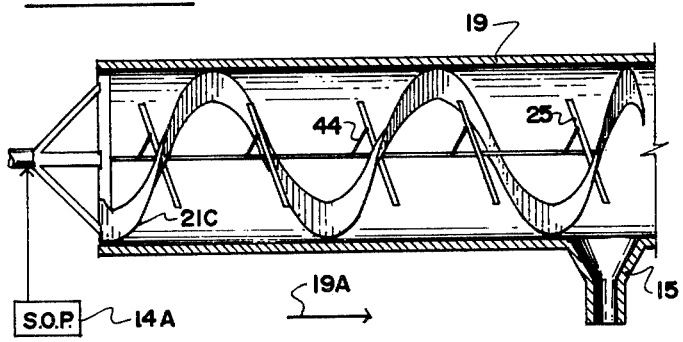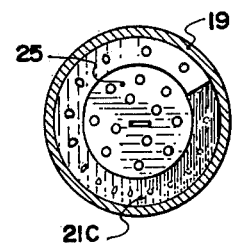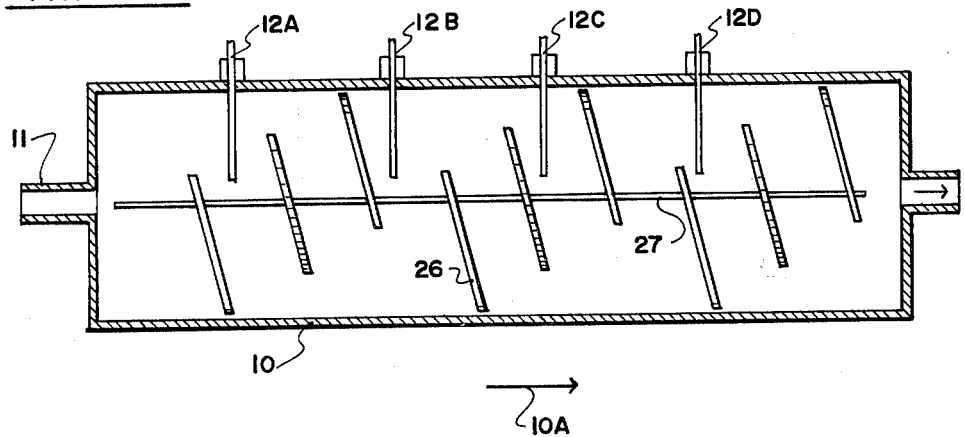

AUGER TYPE SCREENING DEVICE FOR REMOVING SEDIMENT AND THE LIKE FROM SOLUTIONS

BACKGROUND OF THE INVENTION

This invention relates to new and useful improvements in clarifying liquids such as sewage but although the description refers primarily to the clarification of sewage, nevertheless it will be noted that the system and structure can be used for the clarification of any liquids in which the flocculation precipitation or crystalization of solids can be obtained by mixing various chemicals with the liquid and then passing it through the clarifying tubes. Furthermore it relates also to other methods of separating solids such as chilling techniques.

Conventionally, sewage is first pretreated in lagoons to settle out solids and it then passes through first and second filtering tanks or the like which attempt to remove remaining solids. The effluent is then allowed to pass to the disposal outlets which may be rivers, streams, or the like. Unfortunately this effluent still contains a relatively large quantity of impurities, the method is time consuming and relatively large land areas are required for the lagoons.

SUMMARY OF THE INVENTION

The present system and apparatus produces an effluent that meets the standards for human consumption out of primary treated sewage reservoirs, in the shortest possible time, using an arrangement of chemicals to flocculate contaminants in solution and internal baffles to separate the flocculated material. The cleaned effluent may then pass through conventional first and second filtering tanks thus producing a compact secondary and tertiary treatment plant in order to reduce pollution of the aquifers.

One aspect of the invention consists of a modular liquid treatment assembly comprising in combination, means to treat the liquid to induce formation of solids within said liquid, at least one tube clarifier, said clarifier including a casing, an inlet in said casing operatively connected to said first mentioned means, whereby treated liquid is transferred to said casing, a solids outlet in said casing and a liquid outlet in said casing, and an auger assembly journalled for rotation within said casing to urge the settled solids towards said solids outlet, said liquids passing from said casing through said liquid outlet.

Another aspect of the invention consists of a tube clarifier for use with a modular liquid treatment assembly, said clarifier comprising in combination an elongated cylindrical casing, an inlet adjacent one end of said casing, a solids outlet adjacent the other end of said casing and a liquid outlet also adjacent the other end of said casing, an auger assembly journalled for rotation within said casing to urge the settled solids towards said solids outlet, said liquid passing from said casing through said liquids outlet.

Another aspect of the invention is to provide a method for the treatment of contaminated liquids comprising the steps of first causing the solids to separate from the liquid, passing the mixture of solids and liquid through a tube clarifier whereby the solids are settled by gravity, moving the solids along the tube clarifier and then discharging the settled solids from one discharge and the clarified effluent through another discharge from the tube clarifier.

A further aspect of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 is a schematic block diagram of the overall system.

FIG. 2 is a schematic side elevation of part of one embodiment of the clarifier tube.

FIG. 3 is a cross sectional view of FIG. 2.

FIG. 4 is a fragmentary side schematic view of an alternative embodiment of a clarifying tube.

FIG. 5 is a partial section of FIG. 4.

FIG. 6 is a partial schematic view of a yet further embodiment of a clarifier tube.

FIG. 7 is a cross sectional view of FIG. 6.

FIG. 8 is a partial schematic view of a still further or alternative embodiment of a clarifier tube.

FIG. 9 is a cross sectional view of FIG. 8.

FIG. 10 is a partially schematic partially longitudinally sectioned view of the mixing chamber per se.

In the drawings like characters of reference indicate corresponding parts in the different figures.

DETAILED DESCRIPTION

Figure 11:
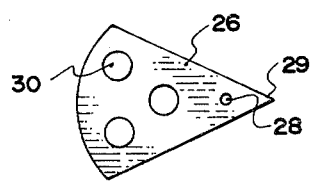
FIG. 11 is an end elevation of one of the baffles within the mixing chamber.

Proceeding therefore to describe the invention in detail, raw sewage or other liquid requiring clarifying is fed into a mixing chamber 10 via line 11 either by gravity or by a pump 13 at which time certain chemicals are mixed with the sewage through a plurality of injector nozzles 12A, B, C, D etc.

The chemically treated sewage then flows to the tube clarifier collectively designated 14 which includes a flocculated material discharge 16 which in turn leads into filtering media tanks 17 having a final discharge 18.

In this particular illustration, the sewage being treated may be mixed with various chemicals which are injected into the mixing chamber and should be fed in a predetermined sequence through the injectors 12A etc.

It is imperative that the chemicals and the quantities be used in proper sequence in order to effect the desired results. However the chemicals used, the quantities and the sequence will depend upon design parameters and do not form part of this invention. However they do act to form flocs, crystals and other solids from the dissolved constituents of the sewage or liquid being treated.

Once treated, the chemical reactions commences and as the treated effluent passes through the tube clarifier, a reacted sludge settles to the lower side thereof.

Various tube configurations can be used as shown in FIGS. 2 through 9 and dealing first with the embodiment shown in FIGS. 2 and 3, the tube clarifier consists of an auger tube 19 with an auger shaft 20 journalled for rotation within the tube and carrying a perforated auger screen 21 thereon. It will be noted that the diameter of the auger flight is substantially equal to the inner diameter of the tube 19 so that any settled flocculated material gradually moves towards the sediment of flocculated material discharge 15 at the far end of the tube. It will be understood that the augers rotate relatively slowly in order to give the flocculated material sufficient time to fall by gravity to the lower side of the tube and to prevent remixing or undue disturbance of the material. The rate at which the effluent enters and leaves the clarifier tube is also controlled by the pump so that the effluent passes through the tube at a rate which gives sufficient time for the majority of the flocculated material to sink to the bottom of the tube and be urged along by the auger. The auger is rotated by any convenient source of power indicated schematically by reference character 14A.

An alternative embodiment shown in FIGS. 4 and 5 also includes a tube 19 having fixed or adjustable baffles 20, which are perforated, situated within the tube in substantially spaced and parallel relationship.

A rotating auger shaft 20A is provided within apertures formed through the lower segment of the baffles and a perforated auger flight 21A is secured to the shaft as clearly shown. Once again the operation of this embodiment is similar to that hereinbefore described.

The embodiment shown in FIGS. 6 and 7 includes an auger tube 19 having a plurality of fixed perforated baffles 23 spanning part of the tube 19 in spaced and parallel relationship in which the tube 19 is provided with a lower portion 24 formed at the base of tube 19 within which a perforated auger flight 21B is mounted upon an auger shaft 20B and acts in a manner similar to the augers hereinbefore described. The baffles 23 are preferably sloped as shown in FIG. 6 inclining forwardly and downwardly in the direction of travel of the effluent through the tubes as indicated by arrow 19A.

FIGS. 8 and 9 show a still further embodiment in which the tube 19 includes a plurality of adjustable central baffles 25 surrounded by a rotating exterior auger flight 21C once again serving to move the flocculated material towards the sediment or flocculated material discharge 15.

Figure 12:
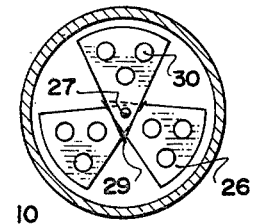
FIG. 12 is a schematic cross sectional view of the mixing chamber showing the segmental baffles.

FIGS. 10, 11 and 12 show the preferred embodiment of the mixing chamber 10 which, in this embodiment, consists of a cylindrical enclosure having a plurality of baffles 26 supported within the enclosure upon a longitudinally extending rod or support 27.

Each baffle 26 takes the form of a sector of a circle with the support 27 extending through an aperture 28 spaced from the apex 29. A plurality of apertures 30 are formed through the baffles and the baffles are arranged spirally along the rod 27 and are secured thereto as by welding or other means. The positioning of the baffles at one particular point within the enclosure, is shown clearly in FIG. 12.

However it will be appreciated that other arrangements of baffles can be used, the principal purpose of these baffles being to agitate and mix thoroughly, the chemicals being injected through 12A, 12B, etc., with the sewage passing through the mixing chamber in the direction of arrow 10A.

Figure 13:
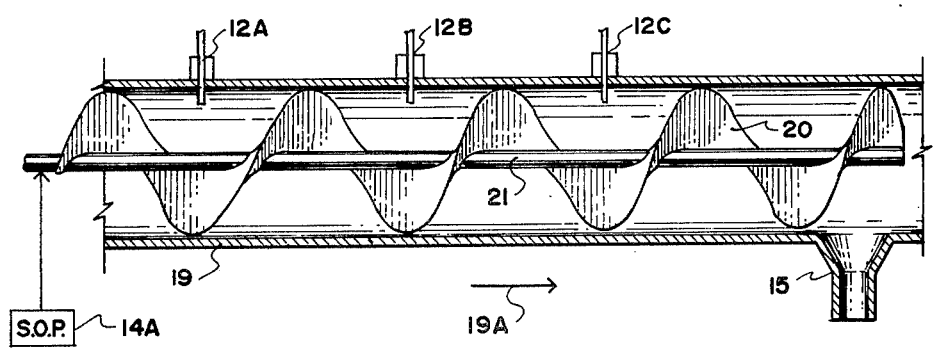
FIG. 13 is a view similar to FIG. 2 but showing chemical injection inlets within the tube rather than in the mixing chamber.

Alternatively, the chemicals may be injected directly into the tube clarifier as shown schematically in FIG. 13. In certain specific applications this would be advantageous but under normal circumstances, the embodiment 10 shown in FIGS. 1 and 10 is suitable.

Figure 14:
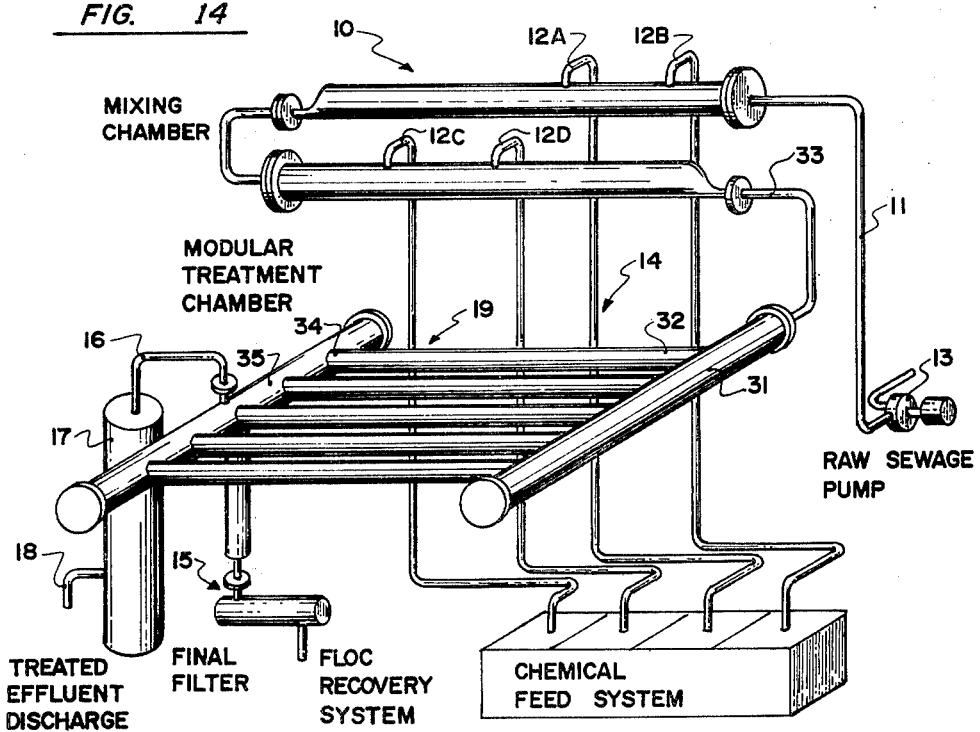
FIG. 14 is a schematic view of the preferred embodiment.
Figure 15:
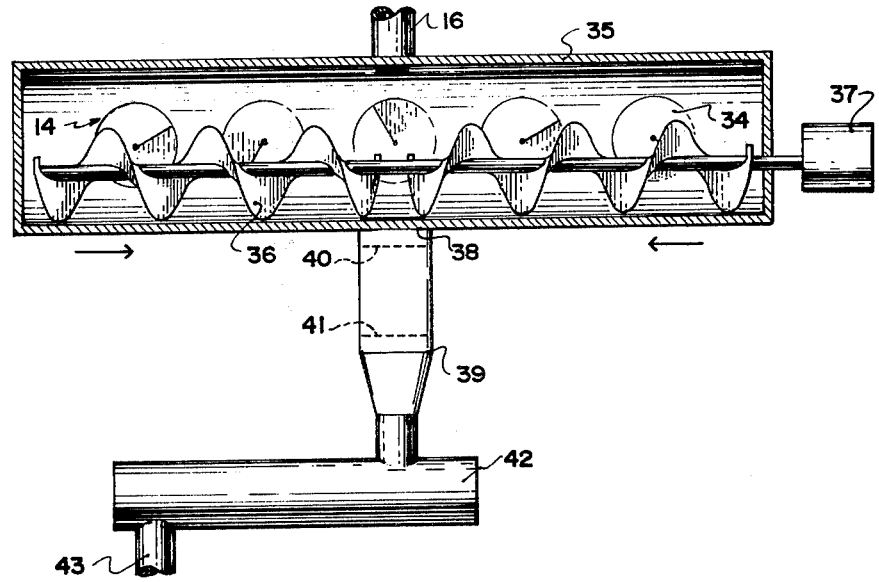
FIG. 15 is a schematic view of the rear header portion of the preferred embodiment.
Figure 16:
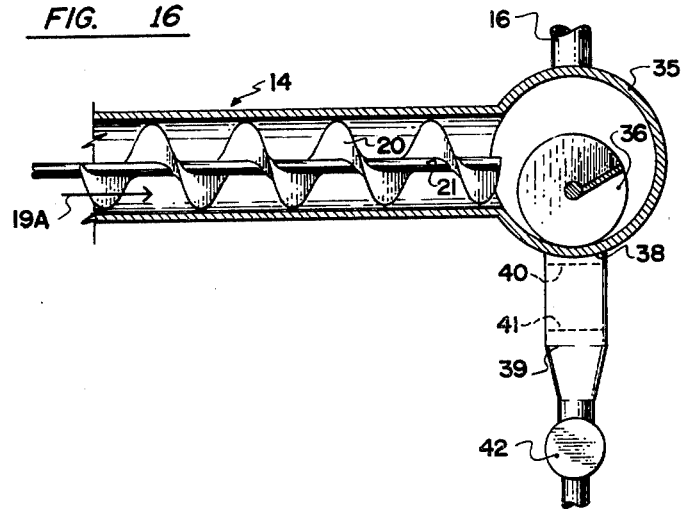
FIG. 16 is a side view of FIG. 15.

The preferred embodiment is shown in FIGS. 14, 15 and 16 with corresponding reference characters being given to parts which are similar to those hereinbefore described.

In this particular embodiment, there are a pair of mixing chambers 10 in series with one another so that the effect is similar to that described and illustrated in FIG. 1.

The plurality of tube clarifiers are in spaced and parallel relationship with one another and are connected to the mixing chamber 10 via transverse header 31 into which the inlet ends 32 of the tube clarifiers engage, a conduit 33 extending between the outlet of the mixing chamber and one end of the transverse intake header 31.

In a similar manner, the outlet or discharge ends 34 of the series of tube clarifiers are operatively connected to a transverse outlet header 35 in spaced relationship along the length of this outlet header.

The operation of the individual tube clarifiers 14 is similar to that hereinbefore described depending upon the embodiment utilized.

However the sludge or solids and the clarified liquid are discharged into the transverse rear header 35 and the solids settle upon the lower side of this transverse tubular header. The clarified liquid discharges through an outlet similar to outlet 16 and thence to the final filter 17.

A left and righthand flighted auger assembly 36 is journalled for rotation within the tubular rear header 35 and driven by a variable speed motor 37 shown schematically in FIG. 15 and it will be noted that this double flighted auger is situated adjacent the lower side of the header and is smaller in diameter than the diameter of the header casing.

The oppositely flighted auger 36 picks up the solids deposited by the individual tube clarifiers and moves them to the solids or sludge outlet 38 situated intermediate the ends of the rear header and upon the underside thereof as clearly shown in FIGS. 14, 15 and 16. The speed of this double flighted auger is controlled by the variable speed motor 37 to suit the circumstances and to prevent undue disturbance of the sludge or solids as they are moved towards the discharge 38.

In all of the embodiments, it will of course be appreciated that a sludge separator or accumulator is required in order to prevent the liquid flowing out through the lower discharge.

This is shown schematically by reference character 39 and may take any convenient form. It of course requires shut-offs or gates shown schematically by dotted lines 40 and 41 so that with gate 40 in the open position, and gate 41 in the closed position, liquid will first fill the accumulator. This will gradually be displaced by the sludge due to gravity, until the accumulator is full whereupon gate 40 is closed and gate 41 opened so that the sludge pump 42 may remove this sludge to a sludge disposal through outlet 43 whereupon the gate position is reversed and the process is repeated. This opening and closing of the gates is preferably automatic and any convenient system may be utilized for this purpose.

FIGS. 4 and 8 show schematically, baffles 22 and 25 respectively which are adjustable in inclination. Linkage 44 shows one method of adjustment in which the links are pivotally secured between the baffles and an actuating rod 45 with the baffles being pivotally secured as at 46, to the upper side of the casing 19. Endwise movement of the rod 45 will give the necessary adjustment to the inclination of the baffles.

A similar structure can be utilized in FIG. 8 although with the external or exterior auger 21C, the baffles cannot be pivoted to the casing 19. However one of the end baffles can be pivotally anchored to one end of the casing (not illustrated) and many other may be provided to allow this specific adjustment of the inclination.

Summarizing, whereas prior art has shown settling tubes for both screening the flocculated material and directing them downwardly, up to now so satisfactory arrangement has been designed for efficiently removing the sediment.

1. It is an aspect of this invention to utilize an auger type screening process where the auger flights may be perforated to accomplish the screening and the auger rotation will remove the sediment.

2. It is another aspect of this invention to show a combination screening and auger process where the screens may be stationary and set at any desired angle for maximum settling efficiency and where the rotating auger may be contained and fitted inside the lower portion of the screens in such a manner as to efficiently remove the sediment. Both are contained in a round tube.

3. It is another aspect of this invention to show a screen-auger system where the auger may be in a smaller circular tube which is integral with the regular inline settling tube.

4. It is again another aspect of this invention whereby a rotating screen and auger combination may be provided where the straight screen discs contain a narrow auger flight on its periphery.

5. It is another aspect of this invention to show a method for changing the angle of the screen so the angle may be changed for maximum efficiency while the unit is in operation.

Finally, it should be noted that the principle of this invention together with the mechanical structure of the tube clarifiers can be used in other industrial environments with different chemicals which either causes flocculation of the solids, or precipitation and crystalization of the solids. Furthermore chilling techniques can be used to cause this separating out of the solids as they pass into the clarifying tubes so that the solids can then be settled by gravity and urged to the sediment or flocculated material discharge end 15 thus leaving a clarified liquid for discharge into the tank 17.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A modular liquid treatment assembly comprising in combination means for treating the liquid to induce formation of solids within said liquid, at least one tube clarifier, said clarifier including a casing, an inlet in said casing operatively connected to said first mentioned means whereby treated liquid is transferred to said casing, a solids outlet in said casing and a liquid outlet in said casing, and an auger assembly journalled for rotation within said casing for urging the settled solids towards said solids outlet, said liquid passing from said casing through said liquid outlet, said auger assembly consisting of a shaft, a series of spaced perforated baffles within said casing, concentrically mounted on said shaft, and a perforated auger flight also concentrically mounted on said shaft, surrounding said baffles and positioned between said baffles and said casing.

2. The assembly according to claim 1 which includes means for adjusting the position of said baffles within limits whereby the angle of inclination of said baffles may be varied relative to the longitudinal axis of said casing.

3. A tube clarifier for use within a modular liquid treatment assembly, said clarifier comprising, in combination, an elongated cylindrical casing, an inlet adjacent one end of said casing, a solids outlet adjacent the other end of said casing, an auger assembly journalled for rotation within said casing for urging the settled solids towards said solids outlet, said auger assembly consisting of a shaft, a series of spaced perforated baffles within said casing, concentrically mounted on said shaft and a perforated auger flight also concentrically mounted on said shaft, surrounding said baffles and positioned between said baffles and said casing.

4. The assembly according to claim 3 which includes means for adjusting the position of said baffles within limits whereby the angle of inclination of said baffles may be varied relative to the longitudinal axis of said casing.

* * * * *